May 24, 1955  C. G. HARD AF SEGERSTAD  2,708,948
QUICK-ACTION CONTROL DEVICE
Filed March 27, 1950
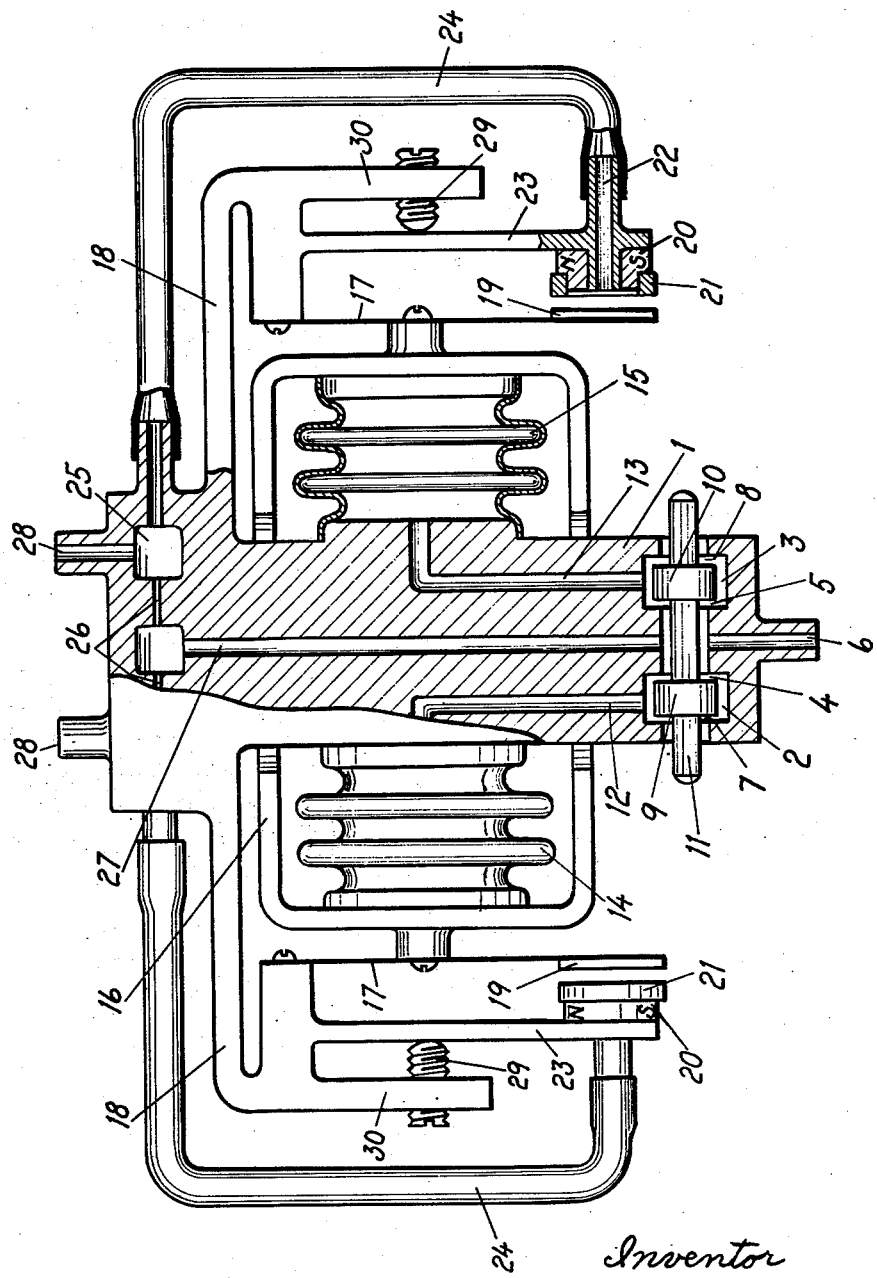
Inventor
Carl Gustaf Hard af Segerstad
by Sommers & Young
Attorneys

United States Patent Office 2,708,948
Patented May 24, 1955

2,708,948

QUICK-ACTION CONTROL DEVICE

Carl Gustaf Hård af Segerstad, Sandviken, Sweden, assignor to Sandvikens Jernverks Aktiebolag, Sandviken, Sweden Application March 27, 1950, Serial No. 152,139

Claims priority, application Sweden March 28, 1949

8 Claims. (Cl. 137—622)

This invention relates to a quick-action operating device.

The principal feature of the device according to the invention consists in that a valve member adapted to be actuated by a feeling member, in dependence on a measure of magnitude, said valve member being connected to or consisting of magnetic material, preferably soft iron, and being resiliently mounted, and arranged to act as a closing member for a magnetic jet, and communicates on one hand through a constricted passage with a pressure medium source and on the other with a pressure sensitive device, for example, a piston, a bellows, or the like.

This device can advantageously be used for actuating, for example, a sorting or controlling member.

The invention will now be described more in detail with reference to the accompanying drawing in which a preferred embodiment of the invention is shown by way of example.

A body 1 contains a measuring device comprising two pressure chambers 2 and 3 provided with throttled inlet passages 4 and 5, respectively, connected to a common pressure medium source through a conduit 6 and with throttled outlet passages 7 and 8 respectively. All of said inlet and outlet passages are simultaneously controlled by members 9 and 10 mounted on a rod 11 movable in its axial direction in accordance with a measure of magnitude sensed and forming a feeling member. The feeling member may, for example, be displaced axially at one end by the variation of thickness of a milled band or the like, and by this displacement pressure medium is distributed to the two conduits 12, 13 in relation to the position of the throttle valves 9, 10. The feeling member 11 may also be displaced by means of any measuring device, which actuates any part of it. It will readily be seen that any axial movement of the feeling member 11 will result in an increase of the pressure in one chamber and decrease of the pressure in the other chamber, and vice versa. Obviously any other suitable measuring device may be used provided that it is able to cause such a pressure difference.

The said pressure chambers 2 and 3 are, through lines 12 and 13 respectively, connected to bellows 14 and 15 respectively, the free ends of which are mechanically interconnected by a frame 16 which is in turn connected to two plate springs 17 fastened to arms 18 made integral with or fastened to the body 1. At their lower ends the springs 17 bear plates 19 of soft iron or the like or, as an alternative, of magnetic material. These plates 19 serve as armatures for permanent magnets, or electrically magnetized members 20 fastened to projections 23 of the arms 18. The poles of the magnets are designated by N and S.

The pole surfaces are preferably provided with thin plates or rings 21 of non-magnetic material in order to prevent the armatures 19 from being too strongly gripped by the magnets. By means of screws 29, mounted in projections 30 of the arms 18 and adapted to exert pressure on the projections 23, which are weaker than the projections 30, the position of the magnets 20 can be adjusted relative to the plates 19. The magnets 20 and the plates 21 are provided with through passages 22 connected to one end of pipes or hoses 24 the other ends of which are connected to chambers 25 in turn by way of constricted passages 26 and a conduit 27 connected to the pressure medium source. The chambers 25 are further through conduit 28 connected to a sorting or controlling device or the like, not shown in the drawing, which may be of arbitrary construction.

The function of the device described is as follows. When the feeling member 11 of the measuring device is in a neutral or initial position the armatures 19 are equally spaced from the magnets 20 the discharge resistance thus being the same in both the passages 22 as well as the pressures in the lines 28. If the measured magnitude is changed in any direction the bellows 14 and 15 displace the frame 16 in one or the other direction whereby one of the armatures 19 is removed from and the other brought closer to its magnet 21. When the last-mentioned armature has gotten so close to its magnet that the magnetic field strength overcomes the resistance of the spring 17 and the pressure medium escaping from the passage 22 the armature suddenly strikes against the plate or ring 21 thereby stopping the stream through the said passage 22 and causing a sudden pressure increase in the appropriate line 28. The sorting or controlling device connected to this line is then rapidly actuated. Both of the lines 28 may be connected to either side of a piston or a bellows or the like which is rapidly thrown in the one direction when the measured magnitude exceeds a maximum value and likewise rapidly moved in the other direction when the measured magnitude falls below a minimum value. In the case of controlling manufactured details in series production, this device may be used for the purpose of, in one direction quickly displacing details, the measures of which exceed the said maximum value, and in another direction displacing details with measures smaller than the minimum value. Although the device according to the invention has been described as being double-sided it is possible to make it one-sided, that is, corresponding to the left or right half of the device shown in the drawing.

The invention is not limited to the particular embodiment described above. Thus, the measuring device may have the form of an electric or any other measuring instrument which, depending on the measured magnitude, actuates the closing member in the manner described.

Having now described my invention, what I claim as new and desire to secure by Letters Patent is:

1. A quick-action control device comprising a feeling member for sensing a measure of magnitude of a control object, a conduit for supplying pressure fluid to the device, a branch conduit connected with said supply conduit and having an opening for discharging a jet of pressure fluid, a magnet fastened to said branch at said opening, a pressure sensitive member, a closure member of magnetic material having a resilient mounting and located in spaced relationship with respect to said opening in position to close the opening when actuated by said magnet, a second branch conduit having a constriction therein and being connected to said pressure sensitive member, said pressure sensitive member being operably connected for moving said closure member toward said magnet, flow control means in said second branch conduit connected for operation by said feeling member according to the measure of magnitude sensed by the feeling member to alter the pressure in the pressure sensitive member to move the closure member into position to be actuated by the magnet to close the discharge opening and thereby cause an increase of pressure in the supply conduit said pressure sensitive member also being operably connected with said closure member to move the closure member away from said magnet and opening such a distance that it will not be attracted by said magnet until said closure member is again moved to reduce the space between the said member sufficiently to make the closure member attractive to the magnet member to again close the discharge opening.

2. A device according to claim 1, and in which the resilient mounting of the magnetic member is a plate spring, and the actuating connection between the pressure sensitive member and the magnetic member comprises a connection between said pressure sensitive member and said spring.

3. A quick-action control device comprising two closure members having magnetic properties, separate resilient mountings for said closure members, two pressure fluid conduits each adjacent one of said closure members and each having a discharge opening for discharging a jet of pressure fluid, said openings being located in closely spaced relation to the respective closure members in position to be closed thereby, magnets located in close proximity to said openings, said conduits being connected by a constricted connecting conduit, a feeling member for sensing a measure of magnitude, means operatively connecting said feeling member with said closure members for moving one or the other of said closure members into position to be actuated by the magnet associated with the respective opening so as to close one or the other of said openings according to the measure of magnitude sensed so as to cause an increase of pressure in the conduit whose discharge opening is closed, said means for moving said closure members also being connected with said closure members to move said closure members away from the respective magnets and openings respectively such distances that they will not be attracted by said magnets respectively until one of said closure members is again moved to reduce the space between itself and its corresponding magnet sufficiently to make the said closure member attractive to the corresponding magnet to again close the corresponding discharge opening.

4. A quick-action control device, comprising a feeling member, displaceable according to the variation of a measure of magnitude of a control object, said member having throttle valve means in conduits for pressure medium, each of said conduits having a connection to a pressure sensitive member, which is displaceable in dependence on the displacement of said feeling member and each of which is resiliently connected to a valve, the corresponding valve seat means of which is situated at a discharge opening for discharging a jet of pressure medium, said valve being closeable by snap action by means of magnetic members, fastened to the valve and valve seat, said opening being situated at the end of a conduit for pressure medium from a pressure medium source, said conduit having a second outlet to a controlled device, said pressure sensitive members being connected to said valves respectively to move the respective valves away from their respective magnets such distances that they will not be attracted to said magnetic members respectively until said valves are moved to reduce the space between said valves and magnetic members sufficiently to make the valves attractive to the respective magnetic members to close the respective discharge opening again.

5. A quick-action control device, comprising a feeling member, displaceable according to the variation of a measure of magnitude of a control object, said member having two fixedly connected throttle valves, the opening of one being accompanied with closing of the other, each of said valves being situated in a conduit for pressure medium, having an outflow into a pressure sensitive member, which is displaceable in dependence on the displacement of said feeling member and each of which is resiliently connected to a closure valve, the corresponding valve seat of which is situated at a discharge opening for discharging a jet of pressure medium, each of said closure valves being closeable by snap action by means of magnetic members, each fastened to the corresponding valve seat when the pressure responsive members move said closure valves within attraction of said magnetic members, each of said openings being situated at the end of a conduit for pressure medium from a pressure medium source, each of said conduits having a second outlet to a common controlled device, said pressure responsive members also being connected with said closure valves to move said closure valves away from their respective valve seats and the corresponding magnetic members apart so that said magnetic members will not be attractive until they are again moved to reduce the space therebetween sufficiently to cause the magnetic members to be mutually attractive again to close the respective corresponding discharge openings.

6. A quick-action control device, comprising a feeling member, displaceable according to the variation of a measure of magnitude of a control object, said member having two throttle valves fixedly connected together, the opening of one being accompanied with closing of the other, each of said valves being situated in a conduit for pressure medium, having an outflow into a pressure sensitive member, which is, by means of a rigid frame member, connected to the pressure sensitive member situated at the outflow of the other conduit, said pressure sensitive members counteracting each other, said frame being at the two opposite moving ends of the combined pressure sensitive means resiliently connected to a closure valve, the corresponding seat means of each of which is situated at an opening for discharging a jet of pressure medium, each of said closure valves being closeable by snap action by means of magnetic members, fastened to said valves and corresponding valve seats, each of said openings being situated at the end of a conduit for pressure medium from a pressure medium source, each of said conduits having a second outlet to a common controlled device, said second outlets being coupled for counteracting impulsing of the controlled device in relation to each other, said frame also being connected with said closure valves to move said closure valves away from said valve seats and magnetic members relatively to a sufficient spacing that the corresponding closure valve and magnetic members are not attractive to each other until they are again moved to reduce the respective space therebetween.

7. A quick-action control device according to claim 6, in which the magnetic members on the one hand are soft iron pieces, each mounted on a flat spring, connected at one end with the valve and at the other end with said frame member, and on the other hand are permanent magnets, connected to the valve seat, which magnetic members will be attached to each other by decreasing distance between them on account of a displacement of the combined pressure sensitive means.

8. A quick-action control device according to claim 6, in which each of the pressure sensitive members are flexible bellows.

References Cited in the file of this patent

UNITED STATES PATENTS

| 1,917,092 | Bristol | July 4, 1933 |
| 1,993,527 | Mears | Mar. 5, 1935 |
| 2,332,627 | Erbguth | Oct. 26, 1943 |
| 2,478,391 | Hård af Segerstad | Aug. 9, 1949 |
| 2,500,407 | Hård af Segerstad | Mar. 14, 1950 |
| 2,575,086 | Atchison | Nov. 13, 1951 |

FOREIGN PATENTS

| 47,236 | France | Nov. 25, 1936 |